United States Patent [19]

Hutchins

[11] Patent Number: 4,572,326
[45] Date of Patent: Feb. 25, 1986

[54] MOTOR VEHICLE LOUDSPEAKER INSTALLATION

[75] Inventor: Bruce E. Hutchins, Milford, Mich.

[73] Assignee: General Motors Corporation, Detroit, Mich.

[21] Appl. No.: 105,511

[22] Filed: Dec. 20, 1979

[51] Int. Cl.⁴ .............................................. H05K 5/00
[52] U.S. Cl. ..................................... 181/150; 181/156
[58] Field of Search ............... 181/148, 150, 156, 199, 181/155, 152

[56] References Cited

U.S. PATENT DOCUMENTS

| | | | |
|---|---|---|---|
| 2,233,459 | 3/1941 | Shoup et al. | 181/150 |
| 2,787,332 | 4/1957 | Fulmer | 181/156 |
| 3,712,411 | 1/1973 | Monroe | 181/156 |
| 3,729,061 | 4/1973 | Tamura | 181/156 X |
| 3,993,162 | 11/1976 | Juuti | 181/156 |
| 3,993,345 | 11/1976 | Croup | 181/150 |
| 4,144,416 | 3/1979 | Babb | 181/156 X |

OTHER PUBLICATIONS

Badmaieff et al., "How to Build Speaker Enclosures," 1st Ed., Howard W. Sams & Co., Inc., pp. 53–84.
Loudspeaker Enclosure Construction Manual, JBL Technical Service Dept., 3249 Casitas Ave., California 90039.

Primary Examiner—L. T. Hix
Assistant Examiner—Brian W. Brown
Attorney, Agent, or Firm—C. R. Meland

[57] ABSTRACT

A loudspeaker installation for the rear shelf of a motor vehicle. A lightweight, ribbed loudspeaker enclosure is fastened to the underside of the rear shelf so as to be suspended into the trunk of the vehicle and disposed about a conventional loudspeaker flush-mounted to the rear shelf. The enclosure acoustically isolates the vehicle passenger compartment from the trunk, and a duct disposed within the enclosure communicates with the passenger compartment to enhance the low frequency audio response of the installation.

1 Claim, 6 Drawing Figures

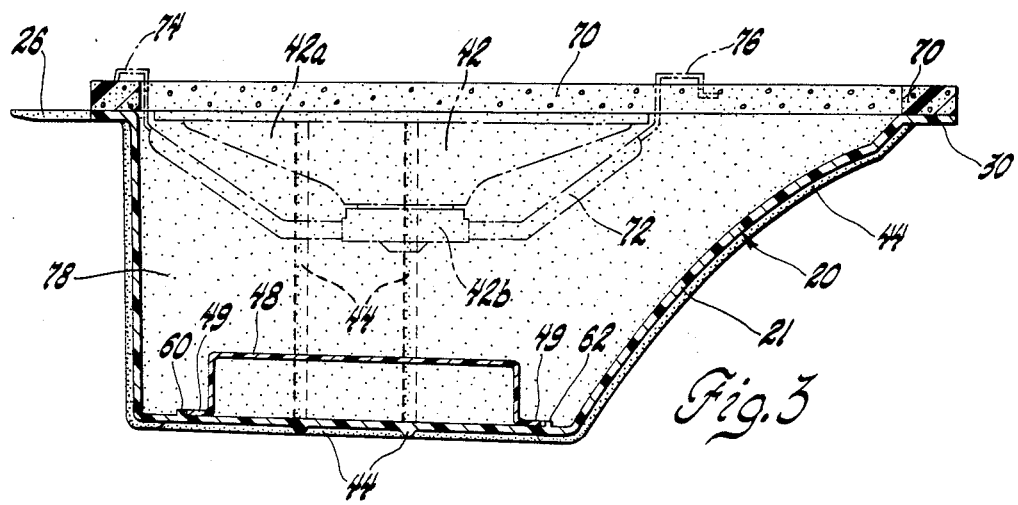
Fig. 3
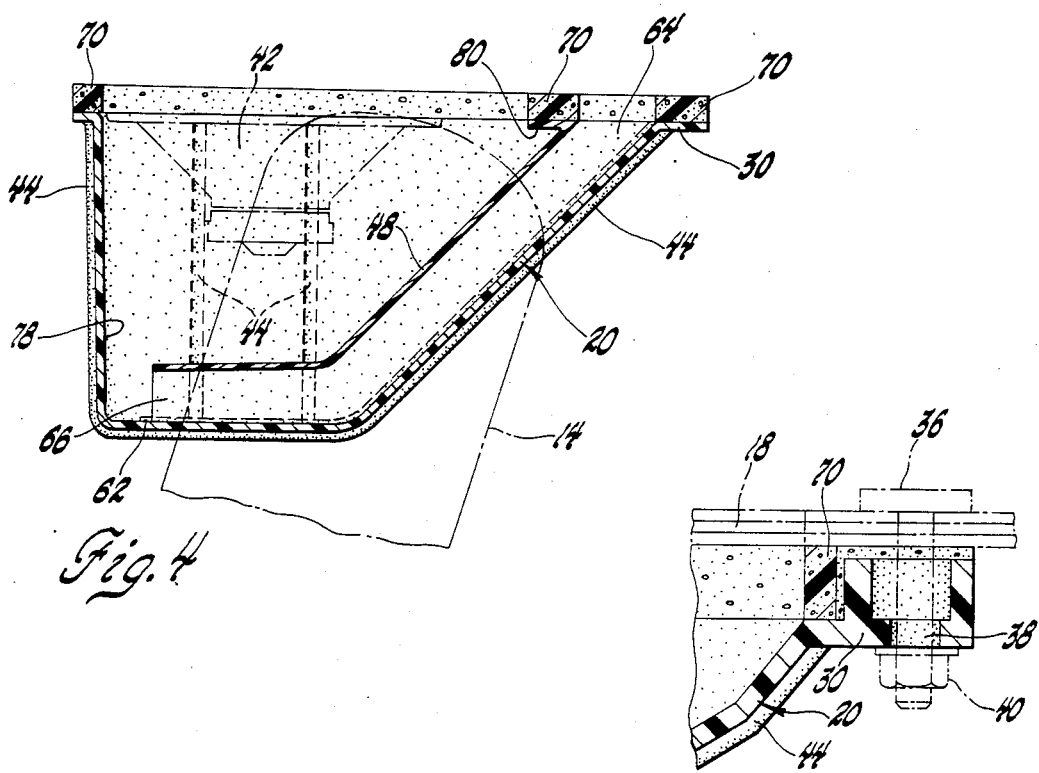
Fig. 4
Fig. 5
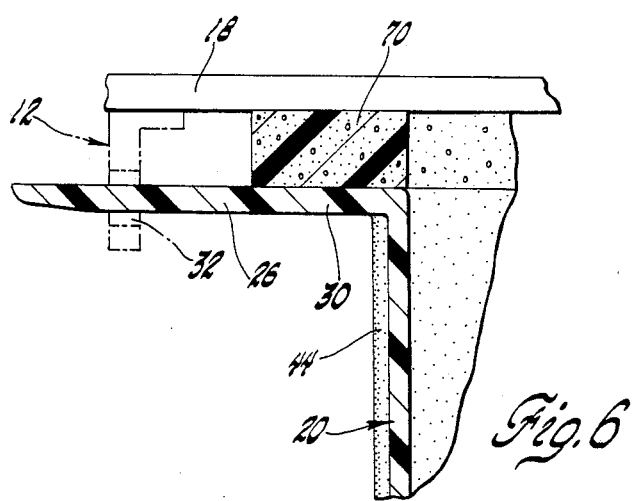
Fig. 6

MOTOR VEHICLE LOUDSPEAKER INSTALLATION

This invention relates to a loudspeaker installation for a motor vehicle and more particularly to a loudspeaker and an enclosure therefor secured to the rear shelf of an automobile and suspended into the trunk thereof.

The automobile rear shelf or rear package shelf (usually located at the rear of the passenger compartment, separating the passenger compartment from the trunk) is often used as a mounting surface for loudspeakers as part of an automotive sound system. In order to afford adequate visibility through the rear window of the automobile, the loudspeakers are typically flush-mounted to the rear shelf so as to be suspended into the trunk beneath the rear shelf. In addition to providing unobstructed visibility through the rear window, a rear shelf flush-mounted loudspeaker installation also provides unusually good low frequency audio response when unenclosed due to acoustical coupling between the loudspeaker and the air-mass enclosed by the trunk. However, an unenclosed flush-mounted loudspeaker installation permits an objectionable amount of road noise to pass from the trunk through the speaker cone and into the passenger compartment. In order to reduce the passage of road noise into the passenger compartment, various loudspeaker enclosures have been provided to form a partial or complete seal between the loudspeaker and the trunk. While such speaker enclosures reduce road noise in the passenger compartment, the enclosures also have the effect of degrading the low frequency audio response of the installation since they attenuate the coupling between the loudspeaker and the air-mass enclosed by the trunk.

It is accordingly an object of this invention to provide an improved automotive loudspeaker installation that prevents the passage of road noise into the passenger compartment while exhibiting acceptable low frequency audio response.

It is another object of this invention to provide an improved automotive loudspeaker installation adapted to be flush-mounted on the rear shelf of the automobile wherein the loudspeaker is acoustically sealed from the trunk.

It is a more specific object of this invention to provide an enclosure for a rear shelf flush-mounted loudspeaker that is suspended into the trunk of an automobile, wherein the enclosure is disposed about the loudspeaker to form a seal between the loudspeaker and the trunk, and wherein the interior of the enclosure is in communication with the passenger compartment through a rear shelf opening and an enclosure duct to thereby improve the low frequency audio response of the loudspeaker while preventing the passage of road noise from the trunk into the passenger compartment.

In fulfilling these objects, the loudspeaker installation of this invention comprises an automotive rear shelf having two openings formed therein, a loudspeaker suspended into the trunk and secured to the rear shelf so as to face one of the openings, a lightweight and rigid cover or enclosure disposed about the loudspeaker and secured to the rear shelf, and a lightweight rigid duct secured to the interior of the cover so that one end of the duct is in communication with the interior of the cover and the other end is in communication with the passenger compartment of the automobile through the other of the two rear shelf openings. The loudspeaker installation of this invention thereby prevents the passage of road noise into the passenger compartment while providing audio frequency response that equals or exceeds that of a flush-mounted rear shelf loudspeaker having no enclosure.

In the Drawinqs:

FIG. 3 and FIG. 4 are cross sectional views of the loudspeaker enclosure of this invention taken along lines 3—3 and 4—4 of FIG. 2.

FIG. 5 and FIG. 6 are cross sectional views of the enclosure fastening means taken along lines 5—5 and 6—6 of FIG. 2.

Figure 1:
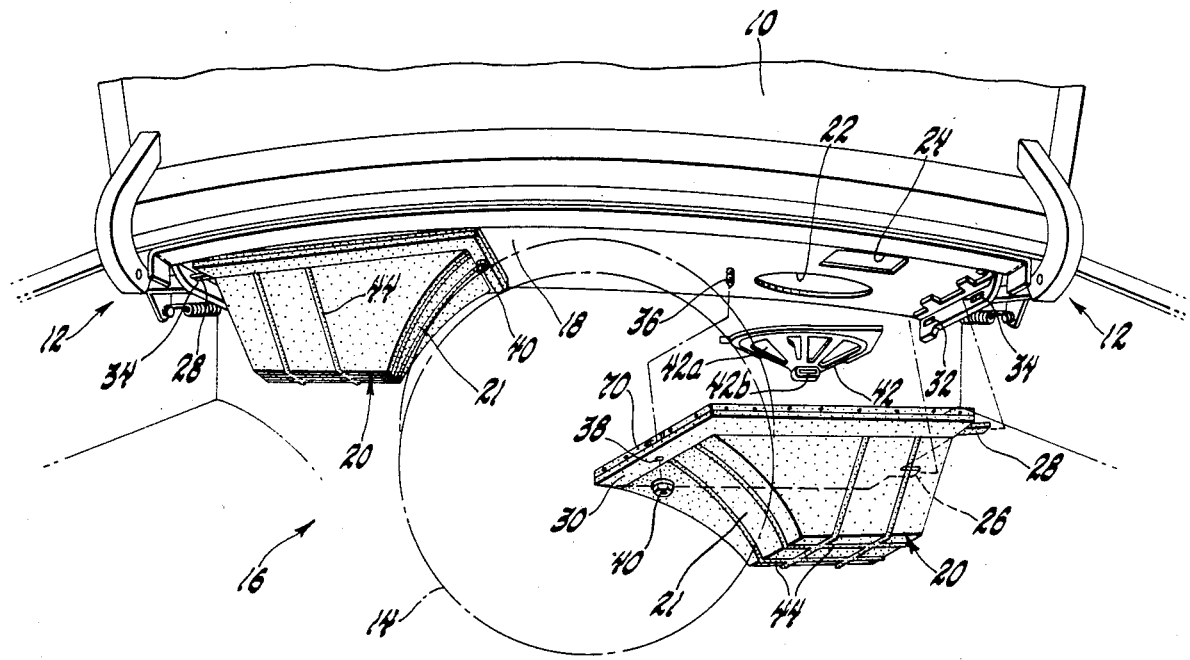
FIG. 1 is an exploded view of the loudspeaker installation of this invention and the environment in which it is to be used.

FIG. 1 depicts a rear view of an automobile, the trunk lid 10 of which is in the raised position. Spring hinge assemblies 12 are provided in a conventional manner to enable the raising and lowering of trunk lid 10, and a spare tire 14 is secured against the front of the trunk compartment which is generally designated by reference numeral 16. Rear shelf 18 extends laterally across the body of the automobile and serves to separate trunk compartment 16 from the passenger compartment (not shown). The loudspeaker installation is depicted in the standard configuration for an automotive sound system—one loudspeaker and enclosure on each lateral end of rear shelf 18. The right-hand speaker installation is shown in an exploded view, and the left-hand speaker installation is shown as completely assembled. For each speaker installation a speaker opening 22 and a port opening 24 are provided on rear shelf 18. A loudspeaker 42 is secured to the underside of rear shelf 18 about speaker opening 22 with conventional mounting fasteners or a spring retainer as will be later explained. Rear shelf opening 24 is cut to conform to the cross sectional shape of a tunnel or duct disposed within speaker enclosure 20 as will be later described. Mounting tabs 26 and 28 extend from rim 30 of speaker enclosure 20 and are adapted to fit in rear shelf slots 32 and 34 respectively to secure the outboard end of speaker enclosure 20 against rear shelf 18. Opening 38 is provided on the inboard side of speaker enclosure rim 30, and a stud 36 which protrudes from rear shelf 18 is adapted to extend through opening 38 and onto nut or fastener 40 for the purpose of securing the inboard side of speaker enclosure 20 against rear shelf 18. Nut 40 may be of the threaded or push-on type as will be well known to those skilled in the art of fasteners. Speaker enclosure surface 21 is curved to accommodate the placement of spare tire 14 as shown.

Figure 2:
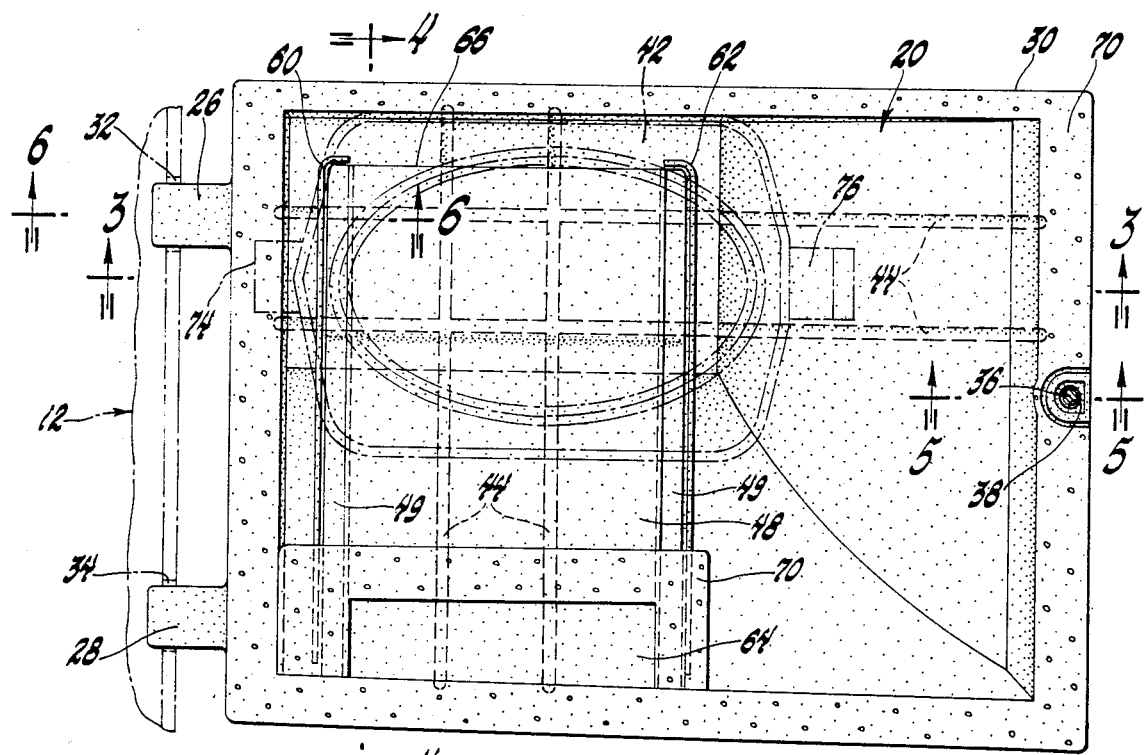
FIG. 2 is a top view of the loudspeaker installation of this invention.

Referring now to FIG. 2, reference numeral 20 designates a top view of a left-hand version of the loudspeaker installation of this invention as viewed from the rear of the automobile. Various elements described in reference to FIG. 1 have been assigned the same reference numerals. Loudspeaker enclosure 20 is constructed of a lightweight material such as plastic (talc-filled polypropylene) and may be formed by injection molding techniques, as will be appreciated by those skilled in the art. To increase the rigidity of speaker enclosure 20, a number of beads 44 are provided on the exterior surfaces of enclosure 20 as part of the molding process. Rigidity of enclosure 20 is important in order to prevent resonant vibration of its side panels as a result of audio signals produced by loudspeaker 42. Loudspeaker 42 may be any automotive speaker of conventional shape and design, comprising a cone 42a, a magnet 42b, and a voice coil (not shown). As will be explained later, loudspeaker 42 is preferably mounted to rear shelf 18 with a spring retainer that cradles the speaker magnet 42b and fastens to clips (not shown) on the underside of rear shelf 18. A lightweight and rigid tunnel 48 is provided on the interior of speaker enclosure 20. Tunnel 48 may also be an injection molded plastic article and it is preferably formed with a lip region 49 on either side so that when tunnel 48 is placed in speaker enclosure 20, a relatively wide contact surface (0.5 inch; 1.27 cm) is accessible for sonically welding, gluing, or otherwise securing tunnel 48 to the inner walls of speaker enclosure 20. Ridges 60 and 62 are provided on the inner walls of speaker enclosure 20 adjacent to the proper placement of tunnel 48 to facilitate placement of tunnel 48 within enclosure 20 and to ensure that tunnel opening 64 is flush or even with speaker enclosure rim 30. In addition, ridges 60 and 62 ensure that tunnel opening 64 is precisely aligned with rear shelf opening 24 when speaker enclosure 20 is mounted against the underside of rear shelf 18. Thus, when speaker enclosure 20 is mounted against rear shelf 18, tunnel opening 64 is in communinication with the passenger compartment of the automobile, and tunnel opening 66 is in communication with the interior of speaker enclosure 20. Tunnel 48 may also be provided with a beaded surface to increase its rigidity. A gasket 70 of urethane foam or other similar material is attached to speaker enclosure rim 30 to act as a cushioning element between speaker enclosure 20 and rear shelf 18 and to form an acoustical seal therebetween. Gasket 70 also extends around tunnel opening 64 in order to provide a similar seal between tunnel opening 64 and rear shelf opening 24. Fastener opening 38 and mounting tabs 26 and 28 will be described in greater detail in reference to FIGS. 5 and 6 respectively.

Referring now to FIGS. 3 and 4, reference numeral 20 designates the loudspeaker enclosure of this invention, viewed in cross section from the rear and side respectively. Various elements corresponding to those depicted in FIGS. 1 and 2 have been assigned the same reference numerals. FIG. 3 illustrates speaker retainer 72 and the placement of speaker 42 relative to speaker enclosure 20. Retainer 72 cradles magnet 42b of loudspeaker 42 and retainer arms 74 and 76 fit over tabs (not shown) provided on the underside of rear shelf 18 in order to firmly secure loudspeaker 42 thereto. Although the preferred method of securing loudspeaker 42 to rear shelf 18 is with retainer 72 as shown, loudspeaker 42 may be secured to rear shelf 18 by any other conventional means. As may be seen in FIG. 4, tunnel 48 is provided with a flange 80 around opening 64 for engaging the periphery of rear shelf opening 24 through gasket 70. As indicated before, ridges 60 and 62 aid in the placement of tunnel 48 within speaker enclosure 20 to ensure that flange 80 lies in the same plane as enclosure rim 30.

FIGS. 5 and 6 specifically illustrate the fastening means for speaker enclosure 20. Various elements corresponding to those depicted in other figures have been assigned the same reference numerals. It will be seen that FIG. 5 details the fastening means for the inboard side of speaker enclosure 20 and that FIG. 6 details the fastening means for the outboard side. Stud 36 may be spot welded to the upper side of rear shelf 18 to facilitate assembly.

In view of the foregoing, it should be apparent that the loudspeaker installation of this invention overcomes the deficiencies present in prior art automotive speaker installations. The tight seal between speaker enclosure 20 and rear shelf 18 provided by the fastening means and gasket 70 prevents the passage of objectionable road noise from the trunk area into the passenger compartment area of the automobile. The road noise sound barrier is achieved without degradation of the loudspeaker audio response due to the nature of speaker enclosure 20. Audio signals emitted from the front of loudspeaker 42 directly communicate with the passenger compartment of the automobile through rear shelf opening 22. Audio signals emitted from the rear of loudspeaker 42 are opposite in polarity and directly couple to the air-mass confined by speaker enclosure 20 and rear shelf 18. Although the audio frequency range over which there is optimum coupling is a function of the volume of speaker enclosure 20, such range may generally be described as low frequency (100–500 Hz). The speaker enclosure air-mass resonates with the rearward audio signals and is coupled to a second air-mass within tunnel 48. The first air-mass thus acts as a spring for coupling rearward low frequency audio signals from loudspeaker 42 to the second air-mass within tunnel 48. Audio signals thereby emitted from tunnel opening 64 into the automobile passenger compartment are in phase with and reenforce audio signals emitted from the front of loudspeaker 42. As a result, the low frequency audio signal level in the passenger compartment of the automobile is enhanced, resulting in an overall sound quality that is equal or superior to that obtainable when no speaker enclosure is used. The added benefit, of course, is the substantial elimination of road noise in the passenger compartment from the trunk area.

The general dimensions of speaker enclosure 20 are constrained by the shape of rear shelf 18 and trunk compartment 16 of the vehicle, and by considerations such as trunk space maximization. For example, the depth of enclosure 20 is limited so as to not interfere with useable trunk space. Despite the variability of the above factors, it is believed that the volume defined by speaker enclosure 20 and the underside of rear shelf 18 should be at least one-third of a cubic foot (0.33 cu. ft.; 9439 cu. cm). In addition, the cross sectional area of tunnel 48 should be approximately six square inches (6.0 sq. in.; 38.0 sq. cm) and its mean length should be approximately ten inches (10 in.; 25.4 cm). As noted in the figures, tunnel 48 conforms to the shape of two interior walls of speaker enclosure 20 so that the desired tunnel length may be achieved in spite of the irregular shape of the enclosure. Also, the space between tunnel opening 66 and interior surface 78 of speaker enclosure 20 should be at least as large as the smaller cross sectional dimension of tunnel 48 in order to prevent obstruction of the audio communication between tunnel 48 and the interior of speaker enclosure 20.

In contrast to conventional loudspeaker enclosures, enclosure 20 is lightweight and may be mass produced on an economical basis. As indicated before, the loudspeaker enclosure must exhibit a fair amount of stiffness in order to prevent the walls from resonating with audio signals produced by loudspeaker 42. The various beads 44 formed on the exterior of enclosure 20 satisfy this requirement without significantly increasing the weight of the enclosure. Enclosure 20 may thus be molded very thinly while maintaining sufficient stiffness to prevent undesired resonation.

While the loudspeaker installation of this invention has been described in reference to a specific embodiment, it should be understood that this invention is not meant to be limited thereto, and that various modifications may be made therefrom without departing from the scope and spirit of this invention.

The embodiments of the invention in which an exclusive property or privilege is claimed are defined as follows:

1. A loudspeaker installation for a motor vehicle comprising in combination:
   a rear shelf extending across a rear portion of the interior of the vehicle separating the passenger compartment and the trunk, said shelf having first and second openings therethrough;
   a loudspeaker suspended into said trunk and secured to said rear shelf about said first opening;
   a loudspeaker housing defined by rigid wall sections disposed in said trunk about said loudspeaker and said second opening, said housing being secured to said rear shelf to define a rigid shroud acoustically isolating said loudspeaker and said passenger compartment from said trunk;
   a rigid U-shaped channel member conforming to inner walls of said housing, the sides of said channel having peripheral lip areas extending perpendicularly therefrom that form a broad contacting surface; and
   means for attaching said channel member lip areas to said inner walls, said channel member and said inner walls thereby defining a duct inside said housing, one end of said duct being in communication with said passenger compartment through said second opening in said rear shelf and the other end being in communication with the interior of said shroud, whereby audio signals produced by said loudspeaker are emitted from said first and second rear shelf openings in a manner to increase the low frequency audio response of the installation.

* * * * *